United States Patent [19]
Morita

[11] Patent Number: 4,595,781
[45] Date of Patent: Jun. 17, 1986

[54] N,N'-DITHIOBISFORMANILIDES AND THEIR USE IN DIENE RUBBER

[75] Inventor: Eiichi Morita, Copley, Ohio

[73] Assignee: Monsanto Company, St. Louis, Mo.

[21] Appl. No.: 479,764

[22] Filed: Mar. 28, 1983

Related U.S. Application Data

[62] Division of Ser. No. 299,891, Sep. 9, 1981, Pat. No. 4,391,953.

[51] Int. Cl.$^4$ .......................................... C07C 145/02
[52] U.S. Cl. ..................................................... 564/102
[58] Field of Search ........................................ 564/102

[56] References Cited

U.S. PATENT DOCUMENTS

| | | | |
|---|---|---|---|
| 1,719,920 | 7/1929 | Bedford | 564/102 X |
| 2,209,976 | 8/1940 | James | 564/102 X |
| 3,071,592 | 1/1963 | Ladd | 260/326.3 |
| 3,407,207 | 10/1968 | Longi et al. | 564/102 X |
| 3,525,727 | 8/1970 | Kern et al. | 260/239.3 |
| 3,631,071 | 12/1971 | Raasch | 564/102 X |
| 3,671,503 | 6/1972 | Schubart et al. | 260/79.5 |
| 3,679,673 | 7/1972 | Brown | 564/102 X |
| 3,705,135 | 12/1972 | Wolfinger | 564/102 X |
| 3,879,459 | 4/1975 | Gattuso | 564/102 |
| 3,997,605 | 12/1976 | Hopper | 260/561 |

FOREIGN PATENT DOCUMENTS 1355801  8/1970  United Kingdom ................ 564/102

OTHER PUBLICATIONS

Chem. Abstracts 31:685g–Tomlinson J. Chem. Soc. 1936, 1607–1609.
Chem. Abstracts 54:11033g–Boudet Bull. Soc. Chim. France 1959, 1971–3.

*Primary Examiner*—Paul F. Shaver
*Attorney, Agent, or Firm*—Gordon B. Seward

[57] ABSTRACT

Substituted or unsubstituted N,N'-dithiobisformanilide compounds are disclosed, where the substituents can be lower alkyl, lower alkoxy, halogen or $CF_3$. The compounds are vulcanizing agents for diene rubbers. Diene rubber compounds containing a cross-linking amount of the above compounds are also disclosed.

10 Claims, No Drawings

N,N'-DITHIOBISFORMANILIDES AND THEIR USE IN DIENE RUBBER

This is a division, of application Ser. No. 299,891, filed Sept. 9, 1981, now U.S. Pat. No. 4,391,953.

BACKGROUND OF THE INVENTION

This invention relates to novel compounds which are unsubstituted or ring-substituted N,N'-dithiobisformanilides and to compositions of diene rubber incorporating the compounds.

The use of disulfide compounds for cross-linking rubber is known. For example, 4,4'-dimorpholinodisulfide,

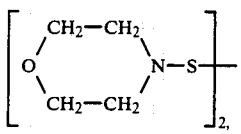

is used in rubber compounds as a partial or total replacement for sulfur, where particular properties are desired in the rubber such as increased reversion resistance and low sulfur bloom. The exact mechanism of such cross-linking is not certain.

In some applications, however, compounds based on morpholine are less desirable, for a variety of reasons.

SUMMARY OF THE INVENTION

A novel class of compounds has been discovered, represented by the formula

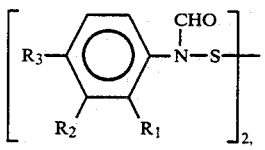

where $R_1$, $R_2$, and $R_3$ are the same or different substituents selected from the group consisting of hydrogen, lower alkyl, lower alkoxy, halogen and $CF_3$.

Lower alkyl means alkyl radicals of 1-5 carbon atoms. Similarly, lower alkoxy means alkoxy radicals of 1-5 carbon atoms, attached to the benzene ring in this case through the oxygen atom.

Also discovered are compositions comprising diene rubber and a cross-linking amount of a compound corresponding to the formula above.

The following compounds are among those included in the class of compounds of the invention:
N,N'-dithiobisformanilide
N,N'- dithiobis(4-methylformanilide)
N,N'-dithiobis(3-methylformanilide)
N,N'-dithiobis(2-methylformanilide)
N,N'-dithiobis(4-ethylformanilide)
N,N'-dithiobis(3-ethylformanilide)
N,N'-dithiobis(2-ethylformanilide)
N,N'-dithiobis(4-n-butylformanilide)
N,N'-dithiobis(3-isopropylformanilide)
N,N'-dithiobis(4-n-pentylformanilide)
N,N'-dithiobis(4-isobutylformanilide)
N,N'-dithiobis(3,4-dimethylformanilide)
N,N'-dithiobis(2-methyl-4-ethylformanilide)
N,N'-dithiobis(2,3,4-trimethylformanilide)
N,N'-dithiobis(2,3-dimethyl-4-ethylformanilide)
N,N'-dithiobis(2-methyl-4-isopropylformanilide)
N,N'-dithiobis(2,3,4-triethylformanilide)
N,N'-dithiobis(4-tert-butylformanilide)
N,N'-dithiobis(4-methyl-3-chloroformanilide)
N,N'-dithiobis(4-chloroformanilide)
N,N'-dithiobis(3-chloroformanilide)
N,N'-dithiobis(2-chloroformanilide)
N,N'-dithiobis(3,4-dichloroformanilide)
N,N'-dithiobis(2,4-dichloroformanilide)
N,N'-dithiobis(2,3,4-trichloroformanilide)
N,N'-dithiobis(4-bromoformanilide)
N,N'-dithiobis(3-bromoformanilide)
N,N'-dithiobis(4-iodoformanilide)
N,N'-dithiobis(4-fluoroformanilide)
N,N'-dithiobis(3,4-dibromoformanilide)
N,N'-dithiobis(3-chloro-4-bromoformanilide)
N,N'-dithiobis(2,3,4-tribromoformanilide)
N,N'-dithiobis(4-methyl-3-bromoformanilide)
N,N'-dithiobis(2-methyl-3-chloroformanilide)
N,N'-dithiobis(4-ethyl-3-chloroformanilide)
N,N'-dithiobis(4-methyl-2-chloroformanilide)
N,N'-dithiobis(4-ethoxyformanilide)
N,N'-dithiobis(3-ethoxyformanilide)
N,N'-dithiobis(4-methoxyformanilide)
N,N'-dithiobis(2-ethoxyformanilide)
N,N'-dithiobis(4-propyloxyformanilide)
N,N'-dithiobis(4-isopropyloxyformanilide)
N,N'-dithiobis(3-butoxyformanilide)
N,N'-dithiobis(3-methoxyformanilide)
N,N'-dithiobis(2-methoxyformanilide)
N,N'-dithiobis(3,4-dimethoxyformanilide)
N,N'-dithiobis(4-methyl-3-methoxyformanilide)
N,N'-dithiobis(3-methyl-4-methoxyformanilide)
N,N'-dithiobis(2-methyl-4-ethoxyformanilide)
N,N'-dithiobis(2-chloro-4-ethoxyformanilide)
N,N'-dithiobis(4-trifluoromethylformanilide)
N,N'-dithiobis(2-trifluoromethylformanilide)
N,N'-dithiobis(3-trifluoromethylformanilide)
N,N'-dithiobis(4-trifluoromethyl-3-methylformanilide)
N,N'-dithiobis(3-trifluoromethyl-4-ethoxyformanilide)

The compounds of the invention can be prepared from the simple formanilide compounds by reacting them with sulfur monochloride, in the presence of an "HCl acceptor" such as triethylamine. A typical reaction is as follows:

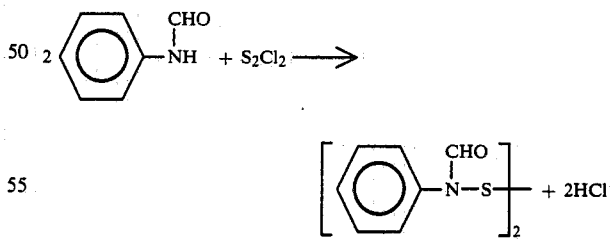

The HCl forms an amine hydrochloride with the triethylamine.

Alternatively, an alkali-metal salt of formanilide, such as potassium formanilide, can be reacted with sulfur monochloride:

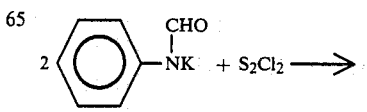

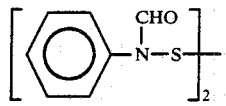

$+ 2KCl$ in which case the "HCl acceptor" is not needed. This latter technique is most successful in the case of more acidic substituted formanilides.

In the above reactions, the simple formanilide starting materials can be synthesized by reacting an aromatic primary amine with formic acid, as described in U.S. Pat. No. 4,187,248, issued Feb. 5, 1980, to H. L. Merten et al. A large number of aromatic primary amines are commercially available as starting materials.

The compounds of the invention have been found to be useful as vulcanizing agents in the cross-linking of diene rubbers. In amounts sufficient to cause cross-linking, the compounds are mixed into diene rubber compounds, either with or without the presence of elemental sulfur. Their use in combination with sulfur permits the preparation of vulcanizates having improved physical properties. And in the absence of elemental sulfur, particular advantages are realized where the use of the vulcanizates dictates that sulfur not be present therein, even if no accelerator is used.

As little as 0.1 part by weight of the compounds of the invention per 100 parts of diene rubber by weight can give measurable results. Where no elemental sulfur is present the amount used will be higher, and can be as high as 5.0 parts by weight per 100 parts of diene rubber by weight.

By diene rubber is meant any of those polymers which contain sufficient olefinic unsaturation as to be cross-linkable with sulfur or sulfur-containing compounds. Natural rubber or synthetic rubber or mixtures thereof are suitable. Synthetic rubbers which can be cross-linked using the compounds of the invention include homopolymers of isoprene and butadiene, copolymers of butadiene or isoprene with other monomers such as styrene, acrylonitrile, isobutylene and methyl methacrylate, for example. Also included are polymers of ethylene, propylene and a diene monomer, known as EPDM polymers, polychloroprene, also known as neoprene, chlorobutyl rubber and chlorosulfonated polyethylene.

The compounds of the invention can be incorporated into rubber by conventional mixing procedures, for example, by adding them in a Banbury mixer or other internal mixer, or by adding them to rubber on a mill. Rubber stocks containing the compounds of the invention can also include the usual compounding ingredients, namely, reinforcing fillers such as carbon black or colloidal silica, pigments such as titanium dioxide, metal oxide activators such as zinc oxide or magnesium oxide, stearic acid, hydrocarbon softeners and extending oils, waxes, amine, ether and phenolic antidegradants, phenylenediamine antidegradants, tackifiers and resin adhesive agents. Accelerators can be used, also, and sulfur, as set forth above.

For the rubber stocks tested and described herein as illustrative of the invention, Mooney scorch times at 121° and 135° C. are determined by means of a Mooney plastometer. The time in minutes ($t_5$) required for the Mooney reading to rise five points above the minimum viscosity is recorded. Longer times on the Mooney scorch test are desirable because this indicates greater processing safety. Cure characteristics are determined at the designated temperatures by means of the Monsanto Oscillating Disk Rheometer which is described by Decker, Wise and Guerry in Rubber World, December 1962, page 68. From the rheometer data, the minimum torque, R min., in rheometer units is recorded. The increase in torque is a measure of the degree of vulcanization and is proportional to the cross-link density. The time, $t_2$, minutes for a rise of two rheometer units above the minimum reading of the rubber sample and the time, $t_{90}$, required to obtain a torque of 90% of the maximum is recorded. The difference, $t_{90}-t_2$, is a measure of the cure rate of the sample. Vulcanizates are prepared by press curing at the selected temperature for the time indicated by the rheometer data to obtain optimum cure. The physical properties of the vulcanizates are measured by conventional methods.

Rubber stocks containing the compounds of this invention may be heated over a wide range of temperatures to effect vulcanization. Generally higher cure temperatures are used with synthetic rubber stocks than with natural rubber stocks. Cure temperatures of 120°–290° C. are suitable with temperatures of 140°–180° C. being more frequently used. The selection of the proper cure temperatures depends upon the ingredients in the rubber composition. A compounder may determine the proper curing parameters for any particular stock by testing the composition with an oscillating disk rheometer.

DETAILED DESCRIPTION

As indicated above, the compounds of the invention can be prepared by first formylating an aromatic primary amine, then reacting the formylated amine with sulfur monochloride to form the bis disulfide. The diene rubber compositions of the invention are prepared by admixture of a cross-linking amount of the compounds. A more complete understanding of the invention can be obtained by reference to the following examples in which all parts are by weight unless otherwise indicated.

EXAMPLE I

Formanilide is produced from aniline and formic acid according to the following procedure:

To 51.2 grams of aniline (0.55 mole) and 200 parts of xylene in a suitable reaction vessel is added 34.1 grams of 90% formic acid (0.67 mole) gradually while maintaining the temperature of the reaction mixture at a maximum of 95° C. After completion of the addition, the mixture is held for an hour at 90°–95° C. The mixture is then gradually heated to 165°–170° C. The distillate is collected until no more water comes off. The remaining mixture is transferred to a rotary evaporator where the solvent is removed and the product is then cooled, forming crystals.

EXAMPLE II

In a similar manner, m-chloroformanilide is produced from m-chloroaniline and formic acid:

To 137.2 g (1.08 mole) of m-chloroaniline in 400 ml toluene is added 55.2 g of 90% formic acid (1.1 mole). A temperature rise from 22° to 31° C. is observed. The mixture is then heated to reflux, a total of 25.5 ml of aqueous material being removed into a Dean-Stark trap. Solvent is removed in a rotary evaporator under partial vacuum at 70° C. Crystals are formed on standing overnight. A small amount of hexane is added to the crystals, which are air-dried. Crude yield is 107 grams. The dried solid is then pulverized, soaked in hexane, filtered and air-dried. Final yield is 101 grams.

Similarly, 2-ethoxyformanilide is produced from o-phenetidine and formic acid; 4-ethoxyformanilide from p-phenetidine and formic acid; 4-methylformanilide from p-toluidine and formic acid.

EXAMPLE III

N,N'-dithiobisformanilide is produced by reacting the sodium salt of formanilide with sulfur monochloride. The sodium salt is produced according to the procedure set forth in U.S. Pat. No. 4,187,248, referred to above.

Into a suitable reaction vessel are charged 37.6 grams (0.26 mole) of sodium formanilide and 300 ml of benzene. To the slurry thus formed are added 18.9 grams (0.13 mole) of sulfur monochloride in 20 ml of benzene, with stirring over a 30 minute period. The contents of the vessel are maintained at 5°–8° C. Stirring is continued for 70 minutes more, during which time the temperature reaches 23° C. The mixture is filtered, and the residue washed with benzene. The benzene is removed in a rotary evaporator and the residue is washed out with ethanol, filtered again, and dried. The dried product (18 g) turned purple on standing, and is recrystallized from benzene to produce a white solid melting at 136°–137° C. On further recrystallization from ethanol/benzene a melting point of 138°–129° C. is obtained. Analysis gives 20.97% sulfur, compared with a calculated level of 21.06% sulfur.

EXAMPLE IV

N,N'-dithiobis(4-ethoxyformanilide) is produced from 4-ethoxyformanilide and sulfur monochloride by the following procedure:

Into a suitable reaction vessel are charged 61.3 (0.4 mole) of 4-ethoxyformanilide, 400 ml benzene and 44.5 g (0.44 mole) triethylamine. To the resultant slurry is added with agitation, over a 50 minute time span, 29 g (0.22 mole) sulfur monochloride in 15 ml benzene. After continuing agitation for 2 hours the mixture is filtered, water-washed and dried, giving 58.2 g product. On recrystallization first from benzene, then from ethanol/benzene, a melting point of 141°–143° C. is determined. The sample analyzed 16.20% sulfur, compared with 16.34% calculated.

In a similar manner, from 4-methylformanilide, N,N'-dithiobis(4-methylformanilide) is produced with a melting point of 120°–121° C. and sulfur analysis of 19.30% compared with 19.29% calculated.

Similarly, from 4-chloroformanilide, N,N'-dithiobis(4-chloroformanilide) is produced with a melting point of 107°–108° C. and sulfur analysis of 17.32 compared with 17.17% calculated.

N,N'-dithiobis(2-methylformanilide) is similarly produced from 2-methylformanilide, and shows a melting point of 103°–104° C., and a sulfur content of 19.41% against 19.29% theoretical.

N,N'-dithiobis(2-ethoxyformanilide) is likewise produced from 2-ethoxyformanilide, and gives a melting point of 100°–102° C., and a sulfur analysis of 16.11% against 16.34% theoretical.

In the same manner, N,N'-dithiobis(2-chloroformanilide) is made from 2-chloroformanilide, showing a melting point of 125°–125.5° C., and a sulfur content of 17.39% against 17.17% calculated.

N,N'-dithiobis(3-chloroformanilide) is similarly produced from 3-chloroformanilide, showing a melting point of 81°–82° C. and a sulfur content of 17.61% versus 17.17% calculated.

N,N'-dithiobis(3-methylformanilide) is produced, in the same manner, from 3-methylformanilide, and exhibits a melting point of 69°–70° C. and a sulfur content of 19.43%, versus 19.29% theoretical.

N,N'-dithiobis(3-chloro-4-methylformanilide) is similarly produced from 3-chloro-4-methylformanilide, and has a melting point of 98°–99° C.

N,N'-dithiobis(3,4-dimethylformanilide) is likewise produced from 3,4-dimethylformanilide, and shows a melting point of 102° C.

Similarly, N,N'-dithiobis(3-trifluoromethylformanilide) is made from 3-trifluoromethylformanilide, and has a melting point of 77°–78° C.

N,N'-dithiobis(4-methoxyformanilide) is similarly made from 4-methoxyformanilide, and has a melting point of 109°–110° C.

DIENE RUBBER COMPOSITIONS

As indicated, the compounds of the invention find use in compositions comprising diene rubber. A number of the compounds were incorporated into rubber compositions and tested for their effect.

EXAMPLE V

A natural rubber masterbatch was prepared by combining, in a laboratory Banbury mixer, the following ingredients in the proportions indicated:

| Material | Parts by Weight |
|---|---|
| Natural Rubber, SMR-CV | 100 |
| Carbon Black, N-220 | 45 |
| Processing Oil, Sundex 790 | 5 |
| Zinc Oxide | 3 |
| Stearic Acid | 2 |
| TOTAL | 155 |

For purposes of comparison, portions of the above masterbatch were compounded on a mixing mill with various combinations of cross-linking agents and accelerators. The trials are listed in Table I following, together with the test results.

Analysis of the test results in Table I shows that N,N'-dithiobisformanilide provides a faster cure than 4,4'-dimorpholinodisulfide when the two are compared in sulfurless systems, while giving aging protection. When compared with N-(cyclohexylthio)phthalmide, a prevulcanization inhibitor, however, N,N'-dithiobisformanilide does not appear to produce scorch delay at this level.

TABLE I

| | SAMPLE | | | | |
|---|---|---|---|---|---|
| | A | B | C | D | E |
| Natural Rubber Masterbatch | 155 | → | → | → | → |
| N—t-butyl-2-benzothiazole-sulfenamide | 0.5 | 0.5 | 0.5 | 0.5 | 0.5 |
| N,N'—dithiobisformanilide | — | 0.5 | 2.5 | — | — |
| 4,4'-dimorpholinodisulfide | — | — | — | 2.5 | — |
| N—(cyclohexylthio)phthalimide | — | — | — | — | 0.5 |
| Sulfur | 2.5 | 2.5 | — | — | 2.5 |
| Mooney Scorch @ 121° C. | | | | | |
| $t_5$, min. | 28.5 | 26.6 | 51.0 | 187.3 | 91.0 |
| $t_{35-5}$, min. | 5.5 | 22.5 | 66.8 | 16.2 | 23.5 |

TABLE I-continued

|  | SAMPLE | | | | |
|---|---|---|---|---|---|
|  | A | B | C | D | E |
| Rheometer @ 153° C. | | | | | |
| $R_{max}$. | 62.0 | 66.2 | 44.0 | 56.0 | 60.2 |
| $R_{min}$. | 4.7 | 4.8 | 4.9 | 4.6 | 4.7 |
| $T_2$, min. | 5.5 | 5.2 | 8.3 | 20.0 | 9.3 |
| $T_{90}$, min. | 13.4 | 15.7 | 24.0 | 37.5 | 21.1 |
| Stress-Strain Min. Cure @ 153° C. Unaged | 20 | 20 | 30 | 42 | 20 |
| $M_{300}$, MPa | 13.5 | 13.5 | 9.9 | 13.5 | 12.2 |
| UTS, MPa | 23.1 | 26.0 | 22.2 | 27.5 | 25.8 |
| Elongation, % | 455 | 485 | 525 | 510 | 520 |
| Hardness, Shore A | 60 | 64 | 63 | 60 | 64 |
| Aged, 48 Hrs. @ 100° C. | | | | | |
| $M_{300}$, MPa | — | — | 5.8 | 10.3 | — |
| UTS, MPa | 6.0 | 6.3 | 8.3 | 17.0 | 7.1 |
| Elongation, % | 200 | 195 | 420 | 445 | 225 |
| Hardness, Shore A | 58 | 58 | 48 | 58 | 58 |

EXAMPLE VI

In a manner similar to that of Example V, a number of the compounds of the invention were tested for their activity as vulcanizing agents, with 4,4'-dimorpholinodisulfide as a control. The same natural rubber masterbatch used in Example V was used, with a sulfurless system. The recipes and the test data are summarized in Table II, following.

Analysis of the data in Table II shows that all of the compounds tested have activity as cross-linking agents, at the level of 3.5 parts by weight per 100 parts of rubber by weight. Although 4,4'-dimorpholinodisulfide gave samples having the highest modulus and ultimate tensile strength, a number of the compounds of the invention gave faster cure times, while still maintaining good scorch delay. The $t_5$ value for sample G appeared to be in unusually low, for reasons unexplained; subsequent tests indicate the correct value to be considerably higher, in the area of 40 minutes.

EXAMPLE VII

Similarly, two of the compounds of the invention were compared with known vulcanizing agents, using the same natural rubber masterbatch, and one part by weight of another accelerator, benzothiazyl disulfide.

TABLE II

|  | SAMPLE | | | | | | | | |
|---|---|---|---|---|---|---|---|---|---|
|  | F | G | H | I | J | K | L | M | N |
| Natural Rubber Masterbatch | 155 | → | → | → | → | → | → | → | → |
| N—t-butyl-2-benzothiazolesulfenamide | 0.5 | → | → | → | → | → | → | → | → |
| 4,4'-Dimorpholinodisulfide | 3.5 | — | — | — | — | — | — | — | — |
| N,N'—Dithiobis(4-ethoxyformanilide) | — | 3.5 | — | — | — | — | — | — | — |
| N,N'—Dithiobis(4-methoxyformanilide) | — | — | 3.5 | — | — | — | — | — | — |
| N,N'—Dithiobis(4-chloroformanilide) | — | — | — | 3.5 | — | — | — | — | — |
| N,N'—Dithiobis(2-chloroformanilide) | — | — | — | — | 3.5 | — | — | — | — |
| N,N'—Dithiobis(2-methylformanilide) | — | — | — | — | — | 3.5 | — | — | — |
| N,N'—Dithiobis(2-ethoxyformanilide) | — | — | — | — | — | — | 3.5 | — | — |
| N,N'—Dithiobisformanilide | — | — | — | — | — | — | — | 3.5 | — |
| N,N'—Dithiobis(3-chloroformanilide) | — | — | — | — | — | — | — | — | 3.5 |
| Mooney Scorch @ 135° C. | | | | | | | | | |
| $t_5$, min. | 70.0 | 23.8 | 40.0 | 25.5 | 32.1 | 46.5 | 47.6 | 36.0 | 21.6 |
| $t_{35-5}$, min. | 13.6 | 5.8 | 17.3 | 11.6 | 18.0 | 27.1 | 22.4 | 21.7 | 10.4 |
| Rheometer @ 153° C. | | | | | | | | | |
| $R_{max}$. | 65.0 | 36.5 | 45.4 | 43.0 | 40.9 | 45.2 | 42.1 | 45.9 | 41.6 |
| $R_{min}$. | 5.1 | 5.4 | 4.6 | 4.8 | 4.2 | 4.0 | 4.0 | 4.2 | 4.5 |
| $T_2$, min. | 25.0 | 10.5 | 14.1 | 10.5 | 12.0 | 16.1 | 16.7 | 13.1 | 9.0 |
| $T_{90}$, min. | 46.4 | 20.9 | 36.2 | 27.2 | 36.7 | 45.1 | 44.7 | 34.2 | 24.8 |
| Stress-Strain Min. Cure @ 153° C. Unaged | 55 | 30 | 40 | 35 | 45 | 50 | 50 | 40 | 35 |
| $M_{300}$, MPa | 13.5 | 6.3 | 9.0 | 8.9 | 8.9 | 9.5 | 9.2 | 9.1 | 8.4 |
| UTS, MPa | 26.7 | 18.8 | 21.7 | 22.7 | 21.5 | 23.8 | 25.1 | 22.9 | 21.8 |
| Elongation, % | 510 | 590 | 540 | 570 | 570 | 560 | 575 | 570 | 570 |
| Hardness, Shore A | 65 | 53 | 54 | 56 | 53 | 55 | 54 | 58 | 54 |
| Aged 48 Hrs. @ 100° C. | | | | | | | | | |
| $M_{300}$, MPa | 11.3 | 5.6 | 5.2 | 5.1 | 5.2 | 5.0 | 5.0 | 6.1 | 5.6 |
| UTS, MPa | 17.1 | 11.7 | 8.4 | 7.8 | 8.7 | 7.5 | 8.6 | 9.1 | 8.1 |
| Elongation, % | 410 | 485 | 415 | 445 | 445 | 425 | 460 | 395 | 405 |
| Hardness, Shore A | 63 | 53 | 48 | 53 | 47 | 50 | 48 | 50 | 48 |

The known vulcanization agents were 4,4'-dimorpholinodisulfide, N,N'-dicaprolactamdisulfide, and a material identified as "alkylphenol disulfide", sold under the trade name "Vultac-5". All of the vulcanizing agents were used at a level of 3 parts by weight per 100 parts of rubber by weight. Test data are listed in Table III following.

Analysis of the data in Table III indicates that the compounds of the invention give, in general, comparable results to the known vulcanizing agents in a sulfurless natural rubber compound accelerated with one part of benzothiazyl disulfide.

Slightly better scorch delay is seen with the compounds of the invention, as compared with N,N'-dicaprolactam disulfide and the alkylphenol disulfide. Both of the compounds of the invention showed significantly faster cure times than the alkylphenol disulfide.

TABLE III

|  | SAMPLE | | | | |
|---|---|---|---|---|---|
|  | O | P | Q | R | S |
| Natural Rubber Masterbatch | 155 | → | → | → | → |
| Benzothiazyl Disulfide | 1 | → | → | → | → |
| 4,4'—Dimorpholinodisulfide | 3 | — | — | — | — |
| N,N'—Dicaprolactamdisulfide | — | 3 | — | — | — |
| Alkylphenol Disulfide | — | — | 3 | — | — |
| N,N'—Dithiobisformanilide | — | — | — | 3 | — |
| N,N'—Dithiobis(3-methylformanilide) | — | — | — | — | 3 |

TABLE III-continued

| | SAMPLE | | | | |
|---|---|---|---|---|---|
| | O | P | Q | R | S |
| Mooney Scorch @ 135° C. | | | | | |
| $t_5$, min. | 25.1 | 15.6 | 7.6 | 20.4 | 25.1 |
| $t_{35-5}$, min. | 4.0 | 5.9 | 5.1 | 7.1 | 7.2 |
| Rheometer @ 153° C. | | | | | |
| $R_{max}$. | 63.0 | 59.7 | 36.3 | 46.7 | 45.2 |
| $R_{min}$. | 5.7 | 5.9 | 5.9 | 5.8 | 5.1 |
| $T_2$, min. | 12.0 | 7.5 | 5.8 | 9.8 | 10.4 |
| $T_{90}$, min. | 21.0 | 18.4 | 20.2 | 18.7 | 19.9 |
| Stress-Strain | 27 | 25 | 35 | 25 | 27 |
| Min. Cure @ 153° C. | | | | | |
| Unaged | | | | | |
| $M_{300}$, MPa | 10.7 | 10.9 | 7.7 | 9.3 | 9.8 |
| UTS, MPa | 26.6 | 25.9 | 20.7 | 23.1 | 21.9 |
| Elongation, % | 535 | 545 | 510 | 540 | 515 |
| Hardness, Shore A | 59 | 59 | 54 | 57 | 53 |
| Aged 48 Hrs. @ 100° C. | | | | | |
| $M_{300}$, Mpa | 11.5 | 9.8 | 7.4 | 7.3 | 7.3 |
| UTS, MPa | 21.3 | 13.1 | 14.3 | 11.1 | 12.6 |
| Elongation, % | 470 | 385 | 475 | 405 | 450 |
| Hardness, Shore A | 58 | 54 | 51 | 51 | 52 |

EXAMPLE VIII

In a similar experiment, a number of the compounds of the invention were compared for their activity as vulcanizing agents in a natural rubber compound containing no sulfur and 0.5 part of the sulfenamide accelerator. The masterbatch was slightly different from the one used in previous examples, and contained the following ingredients and amounts:

| Material | Parts by Weight |
|---|---|
| Natural Rubber, SMR-CV | 100 |
| Carbon Black, N-375 | 40 |
| Processing Oil, Circosol 4240 | 10 |
| Zinc Oxide | 5 |
| Stearic Acid | 1 |
| Wax, Sunolite 240 | 2 |
| N—t-butyl-2-benzothiazole sulfenamide | 0.5 |
| TOTAL | 158.5 |

The vulcanizing agents were added at the level of 8 millimoles per 100 grams of rubber, thus providing a comparison of their effectiveness on an equimolar basis.

In Table IV following, the vulcanizing agents are identified by the type and location of the substituent "X" in the following general formula:

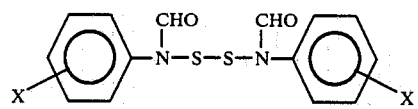

Test results are set forth.

TABLE IV

| | SAMPLE | | | | | | | | | |
|---|---|---|---|---|---|---|---|---|---|---|
| | T | U | V | W | X | Y | Z | AA | BB | CC |
| Masterbatch | 158.5 | → | → | → | → | → | → | → | → | → |
| Substituent "X" | | | | | | | | | | |
| H | 2.44 | — | — | — | — | — | — | — | — | — |
| p-OC$_2$H$_5$ | — | 3.14 | — | — | — | — | — | — | — | — |
| p-CH$_3$ | — | — | 2.66 | — | — | — | — | — | — | — |
| p-Cl | — | — | — | 2.99 | — | — | — | — | — | — |
| o-CH$_3$ | — | — | — | — | 2.66 | — | — | — | — | — |
| o-OC$_2$H$_5$ | — | — | — | — | — | 3.14 | — | — | — | — |
| m-Cl | — | — | — | — | — | — | 2.99 | — | — | — |
| m-CH$_3$ | — | — | — | — | — | — | — | 2.66 | — | — |
| m-Cl, p-CH$_3$ | — | — | — | — | — | — | — | — | 3.21 | — |
| m-CH$_3$, p-CH$_3$ | — | — | — | — | — | — | — | — | — | 2.88 |
| Mooney Scorch @ 135° C. | | | | | | | | | | |
| $t_5$, min. | 28.4 | 33.2 | 35.7 | 21.4 | 36.8 | 41.2 | 19.4 | 36.0 | 27.4 | 40.5 |
| $t_{35-5}$, min. | 5.0 | 7.4 | 7.0 | 4.6 | 10.1 | 15.3 | 4.7 | 7.1 | 6.1 | 5.5 |
| Rheometer @ 153° C. | | | | | | | | | | |
| $R_{max}$. | 15.2 | 16.4 | 16.2 | 15.1 | 16.1 | 16.6 | 14.8 | 15.9 | 13.7 | 16.1 |
| $R_{min}$. | 5.2 | 5.1 | 5.2 | 5.2 | 5.2 | 5.2 | 5.2 | 5.0 | 4.5 | 4.7 |
| $T_2$, min. | 10.2 | 12.9 | 13.1 | 8.0 | 13.5 | 15.2 | 8.0 | 13.2 | 10.7 | 14.8 |
| $T_{90}$, min. | 17.2 | 20.0 | 20.6 | 14.8 | 22.7 | 26.2 | 14.5 | 21.0 | 17.3 | 23.9 |
| Stress-Strain | | | | | | | | | | |
| Min. Cure @ 153° C. | 18 | 20 | 21 | 15 | 23 | 26 | 15 | 21 | 18 | 24 |
| $M_{300}$, MPa | 4.7 | 4.7 | 4.9 | 4.5 | 5.1 | 4.6 | 4.0 | 4.7 | 4.0 | 4.7 |
| UTS, MPa | 15.9 | 16.9 | 16.8 | 15.5 | 17.5 | 15.4 | 14.4 | 15.9 | 14.7 | 16.2 |
| Elongation, % | 605 | 625 | 610 | 585 | 605 | 590 | 610 | 600 | 610 | 590 |
| Hardness, Shore A | 49 | 50 | 50 | 49 | 49 | 47 | 48 | 48 | 48 | 50 |

The data in Table IV indicate that all of the compounds are effective vulcanizing agents. A detailed analysis indicates that the chloro-substituted compounds, on an equimolar basis, give faster cure times and less scorch delay. In general, para-substituted compounds are slightly more active than either meta-substituted or ortho-substituted equivalents.

EXAMPLE IX

In order to evaluate the compounds of the invention in a synthetic rubber compound, a series of compound samples was prepared using an SBR masterbatch of the following formulation:

| Material | Parts by Weight |
|---|---|
| SBR 1500 | 100 |
| Carbon Black, N-330 | 50 |
| Zinc Oxide | 4 |
| Stearic Acid | 2 |
| Wax, Sunlite 240 | 8 |
| Antioxidant, Quinoline type | 2 |

| Material | Parts by Weight |
|---|---|
| TOTAL | 166 |

In Table V, following, several of the compounds of the invention are compared with controls, in an "EV" curing system (without sulfur) and a "semi-EV" system (with only 1.0 part sulfur).

As before, the vulcanizing agents are identified by the type and location of the substituent "X" in the following general formula:

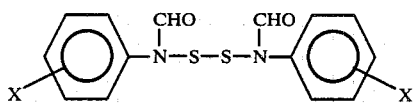

Test results are set forth.

The embodiments of the invention in which an exclusive property or privilege is claimed are defined as follows:

1. A compound of the formula $$\left[ R_3 - \begin{array}{c} \\ \end{array} \begin{array}{c} CHO \\ | \\ N-S \\ \end{array} \right]_2$$

wherein $R_1$, $R_2$, and $R_3$ are the same or different substituents selected from the group consisting of hydrogen, lower alkyl, lower alkoxy, chlorine and $CF_3$.

2. The compound of claim 1 wherein one of the R's is methyl and the remaining R's are hydrogen.

3. The compound of claim 1 wherein one of the R's is ethoxy and the remaining R's are hydrogen.

TABLE V

| | SAMPLE | | | | | | | | | | |
|---|---|---|---|---|---|---|---|---|---|---|---|
| | DD | EE | FF | GG | HH | II | JJ | KK | LL | MM | NN |
| Masterbatch | 166.0 | → | → | → | → | → | → | → | → | → | → |
| Sulfur | 1.75 | — | — | — | — | — | 1.0 | 1.0 | 1.0 | 1.0 | 1.0 |
| N—t-butyl-2-benzothiazolesulfenamide | 1.21 | 1.5 | 1.5 | 1.5 | 1.5 | 1.5 | 1.0 | 1.0 | 1.0 | 1.0 | 1.0 |
| 4,4'—dimorpholinodisulfide | — | — | 1.5 | — | — | — | — | 1.0 | — | — | — |
| Tetramethylthiuram disulfide | — | 0.5 | 0.5 | 0.5 | 0.5 | 0.5 | 0.2 | 0.2 | 0.2 | 0.2 | 0.2 |
| Substituent "X" | | | | | | | | | | | |
| H | — | — | — | 1.5 | — | — | — | — | 1.0 | — | — |
| p-OC$_2$H$_5$ | — | — | — | — | 1.5 | — | — | — | — | 1.0 | — |
| p-OCH$_3$ | — | — | — | — | — | 1.5 | — | — | — | — | 1.0 |
| Mooney Scorch @ 135° C. | | | | | | | | | | | |
| $t_5$, min. | 33.6 | 41.0 | 30.6 | 15.7 | 16.1 | 16.5 | 25.5 | 28.0 | 19.5 | 20.0 | 20.0 |
| $t_{35}$, min. | 41.7 | — | 41.5 | 24.1 | 28.0 | 25.3 | 31.1 | 34.1 | 26.5 | 26.9 | 26.2 |
| Rheometer @ 153° C. | | | | | | | | | | | |
| $t_2$, min. | 13.5 | 16.5 | 12.1 | 7.3 | 8.1 | 7.7 | 9.0 | 10.6 | 7.8 | 8.2 | 7.9 |
| $t_{90}$, min. | 28.2 | 31.0 | 26.0 | 17.4 | 18.9 | 18.0 | 22.0 | 18.3 | 18.1 | 18.3 | 17.7 |
| $t_{90}$-$t_2$, min. | 14.7 | 14.5 | 13.9 | 10.0 | 10.8 | 10.3 | 12.1 | 7.7 | 10.3 | 10.1 | 9.8 |
| $R_{max}$ | 31.0 | 11.1 | 29.1 | 21.4 | 20.0 | 20.4 | 25.4 | 34.4 | 29.2 | 28.4 | 28.9 |

The data in Table V show that the compounds of the invention are effective vulcanizing agents for SBR, both in EV and semi-EV systems.

Although the invention has been illustrated by typical examples, it is not limited thereto. Changes and modifications of the examples of the invention herein chosen for purposes of disclosure can be made which do not constitute departure from the spirit and scope of the invention.

4. The compound of claim 1 wherein one of the R's is chloro and the remaining R's are hydrogen.

5. The compound of claim 1 wherein all of the R's are hydrogen.

6. The compound of claim 1 wherein $R_3$ is ethoxy and $R_1$ and $R_2$ are hydrogen.

7. The compound of claim 1 wherein one of the R's is methyl, one is chloro, and the remaining R is hydrogen.

8. The compound of claim 1 wherein two of the R's are methyl and the remaining R is hydrogen.

9. The compound of claim 1 wherein one of the R's is —$CF_3$ and the remaining R's are hydrogen.

10. The compound of claim 1 wherein one of the R's is methoxy and the remaining R's are hydrogen.

* * * * *